Dec. 23, 1941.　　　A. M. CAMERON　　　2,267,601
DRIVE MECHANISM FOR LOCK SEAM SOLDERING ATTACHMENTS
Filed April 26, 1939　　　2 Sheets-Sheet 1
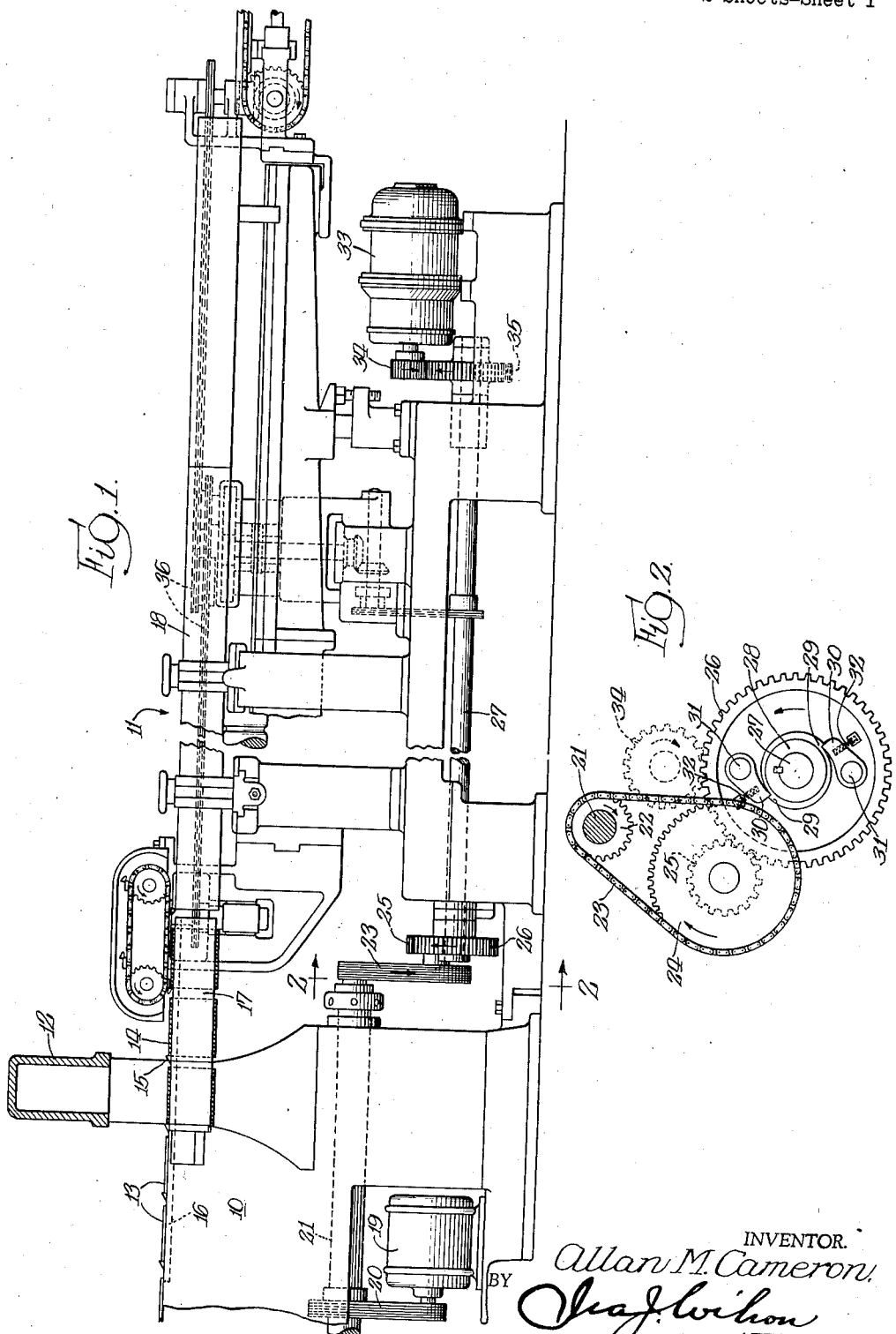
INVENTOR.
Allan M. Cameron,
BY
Ira J. Wilson
ATTORNEY.

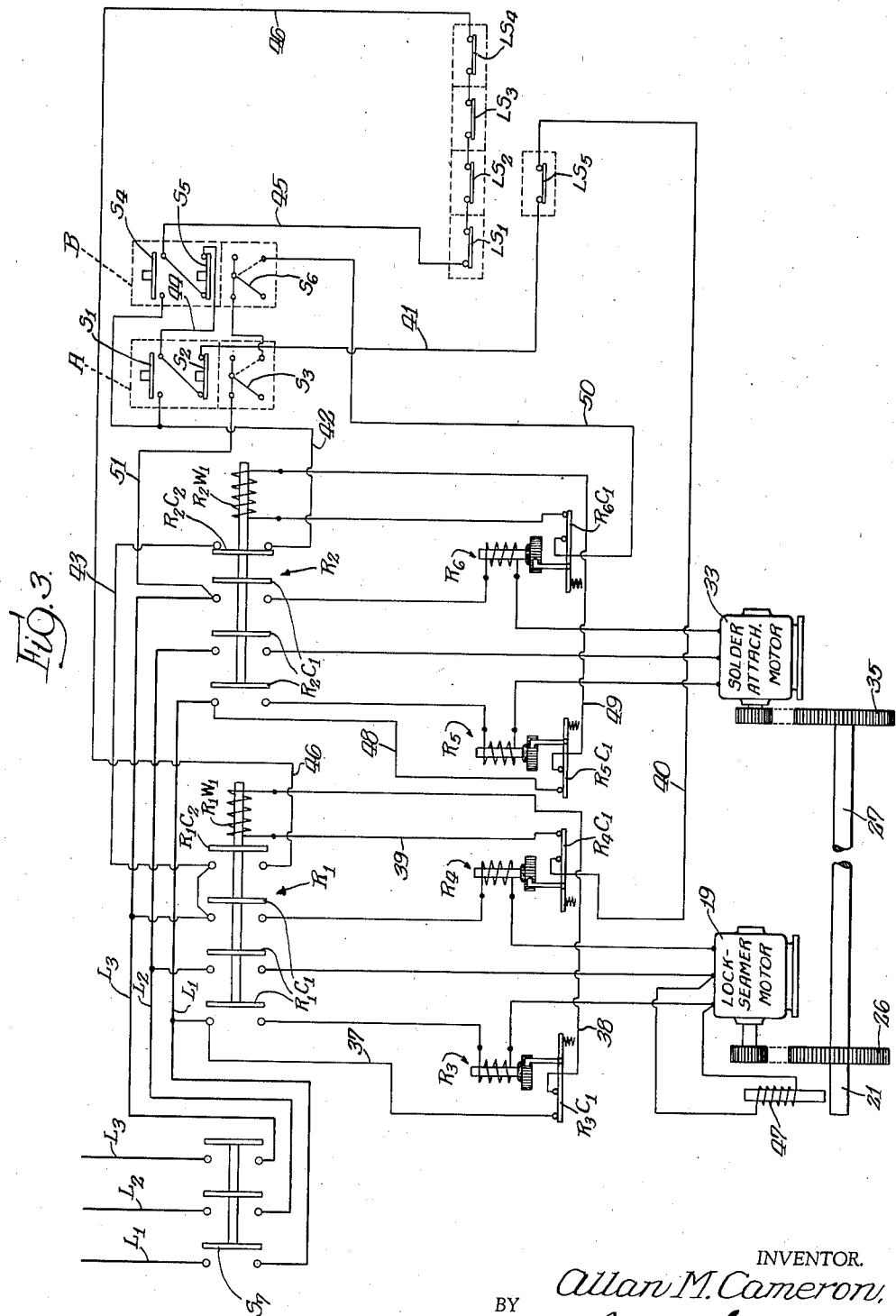

Patented Dec. 23, 1941

2,267,601

UNITED STATES PATENT OFFICE 2,267,601

DRIVE MECHANISM FOR LOCK SEAM SOLDERING ATTACHMENTS

Allan M. Cameron, Chicago, Ill., assignor to Cameron Can Machinery Co., Chicago, Ill., a corporation of Illinois Application April 26, 1939, Serial No. 270,098

9 Claims. (Cl. 113—9)

The present invention constitutes an improvement over the apparatus disclosed in my patent No. 2,167,330, issued July 25, 1939. In this copending application, a form of can making apparatus is disclosed embodying a lock seamer and a so-called soldering attachment. The soldering attachment, which is really a machine in itself, solders the side seams of the can bodies which are formed and delivered to it by the lock seamer. To appreciate the purposes of the present invention some brief attention should first be given to the problems involved in a can making apparatus of the general type indicated.

The lock seamer by which the can bodies are formed and their edges are interlocked delivers the bodies in rapid succession to the soldering attachment by which solder is applied to the interlocked side seams for sealing and strengthening purposes. Modern lock seamers are equipped with various safety devices by which the lock seamer driving mechanism is disabled when a jam is produced or other defects in the operation of the lock seamer occurs. In the event, however, that such prompt stoppage of the lock seamer is accompanied by stoppage of the soldering attachment as well, the can bodies remaining in the attachment will be subjected to such excessive heat from the soldering apparatus that they will be injured and rendered unsatisfactory for use. It is essential, therefore, that the soldering attachment be continued in operation after the stopping of the lock seamer for a sufficient length of time to clear all of the can bodies from the attachment.

In the apparatus disclosed in my co-pending application referred to above, this problem has been met by providing an exactly synchronized drive for the lock seamer and soldering attachment by normally driving them from a single main motor, and by providing an auxiliary motor which is rendered operative automatically, upon stoppage of the main motor, to drive the soldering attachment and thus clear it of cans. This multi-motor drive system, however, introduces other problems of its own. For example, if the main motor should be restarted while the auxiliary motor is in operation, the reinitiated can body delivery from the lock seamer would not be synchronized with the running soldering attachment and a wreck or jam in the can line would result. Accordingly, the principal aim of the present invention is to provide a machine embodying a main and auxiliary motor drive of the general character indicated, but operable through the medium of an improved form of control system such as positively to prevent jamming of the cans and like accidents due to any such mismating of two drive motor actions as that noted above.

More specifically, it is an object of the invention to provide in a combined lock seamer and soldering attachment provided with a main motor mechanism for normally operating both devices in synchronism and an auxiliary drive mechanism for operating the soldering attachment to clear it of cans when the main drive is stopped, a control arrangement for the drive mechanisms such that the main drive cannot, in any event, be restarted until the auxiliary drive has been stopped.

A further object of the invention is to provide in a machine of the type described embodying a main power actuating mechanism for driving both the lock seamer and soldering attachment in timed relation, a switch in the main motor control circuit which requires manual resetting by the operator, and, hence, his specific attention, in the event that the switch is actuated by a jam in the soldering attachment to stop the same.

Still another object is to provide in a machine of the type described a main motor, and a control circuit therefor of such character that the motor is stopped in the event of faulty operation in either the lock seamer or soldering attachment, and can be restarted with a hold-down starting switch when the fault is in the lock seamer but which can only be restarted after a manual resetting of a safety switch if the fault is in the soldering attachment.

The invention also resides in various novel arrangements embodied in the machine's control circuit by means of which maximum safety of operation is achieved with a minimum of equipment.

Further objects and advantages of the invention will become apparent as the following description proceeds, taken in connection with the accompanying drawings in which:

Fig. 1 is a side elevation of a portion of the lock seamer and a soldering attachment embodying the invention;

Fig. 2 is an enlarged detail sectional view taken along the line 2—2 of Fig. 1;

Fig. 3 is a schematic wiring diagram of the control system for the machines of Fig. 1.

For purposes of exemplification, the invention has been shown and described herein as applied to a particular form of can making apparatus (Fig. 1). It will be understood by those skilled in the art, however, that the invention is also applicable to a variety of alternative forms of machinery of the same general class. Consequently, there is no intention to limit the invention to the particular construction disclosed but, on the other hand, the appended claims are intended to cover all modifications and alternative constructions falling within the spirit and scope of the invention.

The particular apparatus shown (Fig. 1) includes two principal units, viz: a lock seamer 10 and a soldering attachment 11. The arch 12 of the lock seamer carries the forming wings and bumping mechanism by which the side seams of the can bodies are locked and bumped. These mechanisms are of well-known construction, and their illustration here is believed to be unnecessary. For present purposes, it is sufficient to note that the body blanks 13, which have been edged and notched by suitable mechanisms, are fed to the forming station and the cylindrical bodies 14 formed from these blanks are fed from the forming station by feed dogs 15, carried by a reciprocatory feed bar 16, in the usual manner. The bodies are discharged from the forming station along an internal horn 17 and in the soldering attachment 11 are conveyed past the soldering mechanism through an external horn 18 by conveyor chains 36.

In general, it will thus be seen that the can bodies are advanced in succession through the lock seamer 10 and then directly through the soldering attachment 11. Consequently, it is of primary importance that the can advancing means of both the lock seamer and soldering attachment should be operated in exactly timed relation, particularly in view of the very high rate of speed at which the can bodies are fed. To achieve the requisite synchronization of the lock seamer 10 and soldering attachment 11, these two machines are actuated by a common drive mechanism. As shown herein (Fig. 1), this drive mechanism embodies a main motor 19 connected through a chain or belt drive 20 with a main shaft 21 and which in turn serves to drive the various mechanisms of the lock seamer through suitable connections (not shown). The shaft 21 projects at the rear end of the lock seamer where it is provided with a sprocket wheel 22 (Fig. 2), which is connected through a chain drive 23 with a second sprocket wheel 24. Fast on the sprocket wheel 24 is a pinion 25 meshing with a gear wheel 26 which forms the drive member of an overrunning drive clutch. This gear wheel 26 is freely rotatable upon the main shaft 27 of the soldering attachment 11 and surrounds a hub 28 keyed on this shaft. The hub is provided with two or more peripheral teeth 29 adapted to be engaged and driven by complemental dogs 30 pivotally carried by the gear 26 upon studs 31 and urged into engagement with the teeth 29 by compression springs 32. The main motor 19 is thus effectually connected to both the lock seamer 10 and soldering attachment 11.

In order to clear the soldering attachment 11 of can bodies in the event that the main motor 19 is stopped, a separate or auxiliary drive mechanism is provided for operating the soldering attachment. This supplemental drive mechanism has been shown herein (Fig. 1) as embodying an auxiliary electric driving motor 33 connected through a pinion 34 with a drive gear 35, which is loosely journaled on the main drive shaft 27 of the soldering attachment. A second overrunning drive clutch is housed within the gear 35. The details of this second drive clutch being substantially identical with the one described above, a detailed description and illustration thereof is unnecessary for its understanding. The auxiliary motor 33 may be substantially smaller than the main motor 19 and is designed to operate at a slower speed. Consequently, when the main motor 19 is operating to drive the shaft 27, the auxiliary motor 33 simply idles as the teeth of its overrunning drive clutch pass beneath the spring-pressed dogs housed in the gear wheel 35. When the main motor 19 is stopped, however, the speed of the shaft 27 decreases until it matches that of the gear 35, at which time the overrunning clutch engages and automatically connects the auxiliary motor to the soldering attachment drive shaft 27. In this way the operation of the soldering atachment is continued so that the can bodies are cleared from it. Incidentally, it will be noted that during the operation of the soldering attachment 11 by the auxiliary motor 33, the teeth 29 of the overdrive clutch housed in the gear 26 pass beneath the drive dogs 30, which remain stationary when the main motor 19 is at rest, so that the auxiliary motor 33 is effectually disconnected from the lock seamer 10.

The various mechanisms of the soldering attachment 11 are driven from its main shaft 27 through suitable drive trains upon which it is unnecessary here to elaborate, as the particular forms of such trains and the mechanisms themselves form no part of my present invention and are sufficiently disclosed, for example, in my Patent No. 2,203,403, issued June 4, 1940.

In accordance with the present invention a novel control system is provided for the machines described above. This control system is preferably such that the main drive motor 19 is first started to drive both the lock seamer 10 and soldering attachment 11 in synchronism as heretofore described. Then the auxiliary motor 33 is started but it operates at a somewhat lower speed than the main motor 19 and, therefore, because of the overrunning drive clutch in the gear 35, simply idles during the normal operation of the machines. In the event that the main motor 19 is stopped for any reason, however, thus stopping the seamer 10, the auxiliary motor 33 continues the operation of the soldering attachment 11 at a slower speed so that it will be cleared of can bodies. Additionally, and of prime importance, the control system is so arranged that after the main motor 19 has once been stopped, and the auxiliary motor 33 connected in driving relation with the soldering attachment 11, the main motor 19 cannot be restarted until the auxiliary motor has been stopped. This control arrangement effectually prevents jamming of the advancing can bodies which would otherwise result from such restarting of the main motor while the auxiliary motor is driving the soldering attachment. That such jamming of the cans would occur will be apparent when it is remembered that the successful transfer of the bodies from the body maker to the soldering attachment can be effected only when the feed mechanisms of the two machines are operating in complete synchronism. Any mismatching of the speeds of the two cooperating mechanisms must be closely guarded against.

The form of control system illustrated (Fig. 3) may be operated from either of two control stations A and B located at suitably accessible points on or near the machines. The control station A embodies "start" and "stop" push buttons $S_1$ and $S_2$ which are biased respectively to their open and closed position, as well as a two-position selector switch $S_3$. The second control station B is identical with the first and thus includes push button "start" and "stop" switches $S_4$ and $S_5$ biased to their open and closed positions, respectively, as well as a two-position selector switch $S_6$. Current for the motors 19 and 33, as well as the control circuits is furnished from suitable supply lines $L_1$—$L_2$—$L_3$ having a manually operable disconnecting switch $S_7$ interposed therein. Also included in the control system are two electromagnetically actuated starting switches $R_1$ and $R_2$ for the main and auxiliary driving motors 19 and 33, respectively. These switches are of standard form, the switch $R_1$ embodying a set of three main contacts $R_1C_1$ which serve, when closed, to connect the motor 19 to supply lines $L_1$—$L_2$—$L_3$. This switch is actuated by an energizing winding $R_1W_1$, and includes a normally open set of sealing contacts $R_1C_2$ for completing a holding circuit for the winding. Similarly, the other motor switch $R_2$ including a set of three main contacts $R_2C_1$ for connecting the motor 33 to the supply lines, as well as an energizing winding $R_2W_1$ and a normally closed set of interlock contacts $R_2C_2$. To protect the motors 19 and 33 against overload, the usual overload relays $R_3$—$R_4$—$R_5$—$R_6$ are utilized. Each of these relays embodies an energizing winding connected in series with one of the motor supply lines, as well as a corresponding set of normally closed contacts $R_3C_1$, $R_4C_1$, $R_5C_1$ and $R_6C_1$. These contacts are interposed in the energizing circuits of the respective actuating windings for the switches $R_1$ and $R_2$ so that if the associated motor draws excessive current the corresponding overload relay will open its contacts and drop out the motor switch, thus disconnecting the motor from the line.

Automatic stoppage of the main drive motor 19, in the event of the feeding of doubles or irregular blanks which cause a jam or by reason of some other defect in operation, is accomplished by opening one of a series of normally closed emergency stop switches $LS_1$, $LS_2$, $LS_3$ and $LS_4$. The mechanisms for actuating such safety switches are well known in the art, a suitable form for the present purposes being shown, for example, in my prior Patent No. 1,883,539, issued October 18, 1932, in which provision is made for stopping the machine in the event a body fails to become locked, or in Patent No. 1,801,181, issued April 14, 1931, disclosing a safety switch operable by an irregular or deformed blank or by the inadvertent feeding of more than one blank at a time. Similarly, the main drive motor may be automatically stopped by opening of a normally closed safety switch $LS_5$. This latter switch is adapted to be operated by a shear pin safety device of a conventional form, such as is exemplified in U. S. Patent No. 1,972,601, issued September 4, 1934, interposed in the drive mechanism for the can carrier chain 36 in the soldering attachment 11 (Fig. 1). In particular, the switch $LS_5$ is so arranged that when it is opened as a result of breakage of the shear pin it cannot be reclosed until the operator resets the shear pin device, thus insuring his attention to the condition of the machine.

The main shaft 21 in the lock seamer 10 is brought to rest and held against rotation, whenever the main motor 19 is deenergized, by a normally engaged brake (not shown). This brake is released by energization of an operating solenoid 47 (Fig. 3) which is connected in parallel with the motor 19 so that whenever the motor is energized the solenoid is also energized to release the brake.

To condition the control system for operation, the operator first closes the disconnecting switch $S_7$. Then the main drive motor 19 may be started by momentarily closing either of the "start" push button switches $S_1$ or $S_4$. For example, upon closure of the switch $S_1$, the main motor switch energizing winding $R_1W_1$ is energized (through a starting circuit $L_1$—37—$R_3C_1$—38—$R_1W_1$—39 — $R_4C_1$—40—$LS_5$—41—$S_2$—$S_1$ — 42—$R_2C_2$—43—$L_3$). Thereupon the main switch $R_1$ closes its contacts $R_1C_1$, to connect the main motor 19 to the supply lines, and at the same time it closes its sealing contacts $R_1C_2$ to complete a holding circuit in shunt with the push button switch $S_1$ (through 44—$S_5$—45—$LS_1$—$LS_2$—$LS_3$—$LS_4$—46—$R_1C_2$—$L_3$) so that the motor switch $R_1$ will remain energized after release of the momentarily actuated push button $S_1$. The "start" push button switch $S_4$ at the other control station B is connected in parallel with the start switch $S_1$ and, of course, operates to start the main motor 19 in the same manner when momentarily closed. It will be noted that upon the application of voltage to the main motor 19 the brake solenoid 47 is energized to release the normally engaged brake, which holds the main shaft 21 against rotation when the main motor is deenergized.

Having started the main motor 19 in the manner described above, the operator next starts the auxiliary motor 33 so that it will be running and in condition to take over the drive of the soldering attachment when required. For this purpose, the selector switches $S_3$ and $S_6$ in the control stations A and B are shifted to their right hand positions (shown in dotted lines in Fig. 3) thereby energizing the actuating winding $R_2W_1$ of the auxiliary motor switch $R_2$ (through a circuit $L_1$—48—$R_5C_1$—49—$R_2W_1$—$R_6C_1$— 50 —$S_6$—$S_3$—51—$L_3$). Thereupon the switch $R_2$ closes its main contacts $R_2C_1$ to connect the auxiliary motor 33 to the supply lines $L_1$—$L_2$—$L_3$ and also opens its interlock contacts $R_2C_2$. Thereafter, the auxiliary motor 33 continues to run but at a somewhat lower speed than the main motor 19 so that the latter does all of the actual driving of the two machines because of the overrunning clutch arrangement heretofore described.

The main motor 19 may be stopped at will by momentarily opening one or the other of the "stop" switches $S_2$ or $S_5$. As was heretofore noted, these switches are interposed in the holding circuit of the switch $R_1$. Consequently, when one of the "stop" switches is opened the switch $R_1$ is dropped out and the motor 19 deenergized. Similarly, the auxiliary motor 33 may be stopped at will, by opening one of the selector switches $S_3$ or $S_6$ which are interposed in the energizing circuit of the auxiliary motor switch $R_2$.

In case of a faulty operation in the lock seamer 10 one of the safety switches $LS_1$—$LS_4$ is automatically opened. Like the "stop" switches $S_2$ and $S_5$, these safety switches are interposed in the holding circuit of the main motor switch $R_1$ so that as soon as they are opened the main motor is stopped. It should be noted that the main motor 19 can be energized by holding down one of the "start" switches $S_1$ or $S_4$ even when one of the safety switches $LS_1$—$LS_4$ is open.

This is advantageous in that the lock seamer can be inched along in this manner in clearing away a wreck. During such operation, the main motor will, of course, remain energized only so long as the "start" switch is held closed since the opened safety switch prevents completion of the holding circuit for the motor switch R1. Furthermore, the "start" switches are of the so-called hold-down type (i. e. they are spring biased to one position and must be manually held in the other) so that attention of the operator is compelled while running on the starting circuit only, in the manner just described.

Similarly, opening of the safety switch LS5, upon an overload on the soldering attachment conveyor chain 36, stops the main motor 19. This safety switch is, however, interposed in a portion of the energizing circuit for the main motor switch R1, which is common to both the holding and starting portions of the energizing circuit. As a result, the switch R1 cannot be reenergized to restart the main motor 19 even by holding down one of the "start" switches S1 or S4 until the safety switch LS5 has been manually reclosed. This necessity for manual reclosure of the safety switch LS5 compels the operator's attention to the jam or other fault in the soldering attachment which has occasioned the opening of the safety switch.

Whether the main motor 19 be stopped by one of the "stop" switches S2 or S5, or by one of the safety switches, the auxiliary motor 33 always operates in the same manner through its associated overdrive clutch to continue the operation of the soldering attachment 11 and thus clear it of can bodies, all in the manner described above. It should also be borne in mind that the restarting of the main motor 19 described above, after opening of one of the safety switches LS1, LS2, LS3, LS4, can only be accomplished after the auxiliary motor 33 has been stopped. The interlocks which compel this latter sequence of operations is next described.

Restarting of the main motor 19, before the auxiliary motor 33 has been stopped, is positively prevented by the interlock contacts R2C2 (Fig. 3). These contacts are interposed in the starting circuit of the main motor switch R1, although they are not included in the holding circuit for this switch. Consequently, the main motor switch R1 can only be initially energized when the auxiliary motor switch R2 is deenergized. After the main motor switch R1 has once been energized, however, it is retained energized through its holding circuit so that the subsequent opening of the interlock contacts R2C2, upon energization of the auxiliary motor switch R2, will not drop out the main motor switch R1.

To stop the auxiliary motor 33, for example, after the soldering attachment 11 has been cleared of cans, one or both of the selector switches S3, S6 is manually shifted to open position (shown in full lines in Fig. 3). This open circuits the auxiliary motor switch R2 so that it drops out and thereby disconnects the motor 33 from the supply lines L1—L2—L3. After the auxiliary motor 33 has thus been stopped and the difficulty in the can line cleared up, the main and auxiliary drives may be restarted in the normal sequence heretofore described.

From the foregoing, it will be apparent that the machine is fully protected by the automatic control system in the event of a jam or other faulty operation. To this end the seamer 10 is automatically stopped and the soldering attachment 11 cleared of cans. Additionally, the machines are protected against damage due to inadvertent or improvident attempts at restarting the main drive before the auxiliary drive is stopped, since the controls positively compel a predetermined and safe sequence of starting operations.

I claim:

1. The combination with a lock seamer and a soldering attachment, each including means for advancing successive cans therethrough, of means including a main driving motor for operating the can advancing means of both said seamer and said soldering attachment in timed relation, control means for disabling said main motor, means rendered operable automatically in response to stoppage of said main motor to drive the can advancing means of said soldering attachment, to thereby clear the soldering attachment of cans previously delivered to it by the seamer, said last named means including an auxiliary driving motor, and means for preventing restarting of said main motor except when said auxiliary motor is stopped, to thereby prevent delivery of additional cans to said soldering attachment while it is being cleared by said auxiliary motor.

2. The combination with a lock seamer and a soldering attachment each including means for advancing successive cans therethrough, of means including a main driving motor for operating the can advancing means of both said seamer and said soldering attachment in timed relation, a control circuit for said main motor, control means for stopping said main motor, means rendered operable automatically in response to stoppage of said main motor to drive the can advancing means of said soldering attachment, to thereby clear the soldering attachment of cans previously delivered to it by the seamer, said last named means including an auxiliary driving motor, means including an electromagnetic switch for connecting said auxiliary motor to a source of current, and means including a set of interlock contacts on said switch and interposed in said main motor control circuit for preventing restarting of said main motor except when said switch is open to deenergize the auxiliary motor, to thereby prevent delivery of additional cans to said soldering attachment while it is being cleared by said auxiliary motor.

3. The combination with a lock seamer and a soldering attachment, each including means for advancing successive cans therethrough, of means including a main power actuating mechanism for driving a can advancing means of both said seamer and soldering attachment in timed relation, control means for disabling said power actuating mechanism, means operable automatically in response to disabling of said main power actuating mechanism to drive the can advancing means of said soldering attachment and thereby clear it of cans, said last named means including an auxiliary power actuating mechanism, and means for preventing reinitiation of the actuation of said can advancing means by said main power actuating means except when said auxiliary power actuating means is disabled against driving the can advancing means of said soldering attachment.

4. The combination with a lock seamer and a soldering attachment, each including means for advancing successive cans therethrough, of a main power actuating mechanism for driving the can advancing means of both said seamer and soldering attachment in timed relation, means operable automatically in response to disabling of said main power actuating mechanism to drive the can advancing means of said soldering attachment and thereby clear it of cans, said last named means including an auxiliary power actuating mechanism, control means for the respective power actuating mechanisms, and interlock means cooperating with said control means for positively compelling a predetermined sequence in the initiation of operation of said mechanisms.

5. The combination with a lock seamer and a soldering attachment, each including means for advancing successive cans therethrough, of means including a main driving motor for operating the can advancing means of both said seamer and said soldering attachment in timed relation, means including a first electromagnetic switch having an energizing circuit for connecting said main motor to a source of current, means rendered operable automatically in response to stoppage of said main motor to drive the can advancing means of said soldering attachment, to thereby clear the soldering attachment of cans previously delivered to it by the seamer, said last named means including an auxiliary driving motor, means including a second electromagnetic switch for connecting said auxiliary motor to a source of current, and means including a set of interlock contacts on said second switch and interposed in said energizing circuit of said first switch for preventing reenergization of said first switch to restart said main motor except when said second switch is open to stop said auxiliary motor.

6. The combination of a lock seamer, a soldering attachment having a main drive shaft, a main motor connected to drive the lock seamer and connected through an overdrive clutch to the drive shaft of the soldering attachment, whereby the lock seamer and soldering attachment are normally driven in timed relation, an auxiliary motor connected to said drive shaft through a second overdrive clutch and conditioned to operate at a no-load speed less than the speed of the main motor during normal operation of the latter in driving the lock seamer, and means for preventing starting of said main motor except when said auxiliary motor is stopped.

7. The combination of a lock seamer, a soldering attachment having a main drive shaft, a main motor connected to drive the lock seamer and connected through an overdrive clutch to the drive shaft of the soldering attachment, whereby the lock seamer and soldering attachment are normally driven in timed relation, an auxiliary motor connected to said drive shaft through a second overdrive clutch and conditioned to operate at a no-load speed less than the speed of the main motor during normal operation of the latter in driving the lock seamer, safety control means for stopping said main motor in response to faulty operation in said lock seamer thereby permitting the auxiliary motor to drive the soldering attachment through said second overdrive clutch, and means for preventing starting of said main motor except when said auxiliary motor is stopped.

8. The combination with a lock seamer and a soldering attachment, of a power actuating means for driving both said seamer and soldering attachment, control means including a hold-down switch normally operable to start said power actuating means in response to a momentary actuation of said switch, safety means associated with said control means for stopping said power actuating means in response to faulty operation in said seamer and for conditioning said control means for restoration of operation of said power actuating means only while said switch is held down, and a second safety means associated with said control means and including a manually reclosable switch for stopping said power actuating means upon opening of said switch in response to faulty operation in said soldering attachment and for positively preventing restoration of operation of said power actuating means until said last named switch is manually reclosed.

9. The combination with a lock seamer and a soldering attachment, of an electric motor for driving both said seamer and soldering attachment, means including an electromagnetic switch for connecting said motor to a source of current, an actuating circuit for said switch incluidng a starting circuit portion and a shunt connected holding circuit portion as well as a common portion connected in series with both the first named portions, a hold-down starting switch in said starting portion of said circuit, a set of sealing contacts on said electromagnetic switch interposed in said holding portion of said circuit, a normally closed safety switch interposed in said holding portion of said circuit and arranged to be opened in response to faulty operation in said seamer, and a second normally closed safety switch interposed in said common portion of said circuit and arranged to be opened in response to faulty operation in said soldering attachment.

ALLAN M. CAMERON.